UNITED STATES PATENT OFFICE.

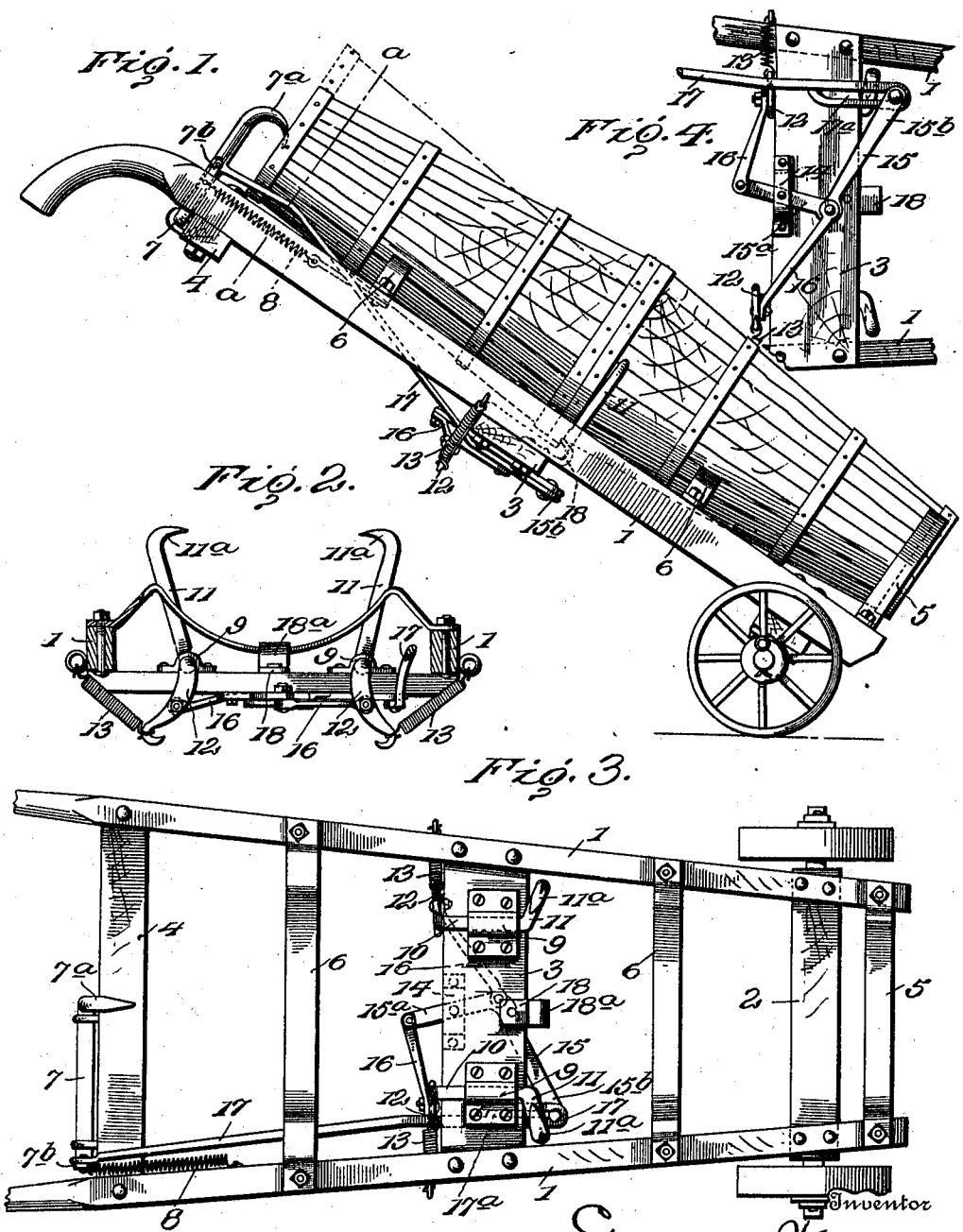

EDWARD M. WEST, OF BRIDGETON, NEW JERSEY, ASSIGNOR, BY DIRECT AND MESNE ASSIGNMENTS, TO AUTOMATIC HAND-TRUCK COMPANY, OF BRIDGETON, NEW JERSEY, A CORPORATION OF NEW JERSEY.

TRUCK.

993,008.

Specification of Letters Patent.

Patented May 23, 1911.

Application filed June 2, 1910. Serial No. 564,627.

*To all whom it may concern:*

Be it known that I, EDWARD M. WEST, a citizen of the United States of America, and a resident of Bridgeton, in the county of Cumberland and State of New Jersey, have invented certain new and useful Improvements in Trucks, of which the following is a specification.

This invention relates to trucks designed to carry shipping boxes or packages of merchandise and is more particularly designed to load and carry a plurality of superposed crates of the "hamper" type, although its utility is not limited to this species of load.

Shipping boxes are usually arranged in tiers during transportation or storage. In the case of crates of the "hamper" type, these packages are sometimes tiered top to top and sometimes bottom to top. My invention is capable of loading such crates tiered in either manner, although as before stated, it can be used in connection with other forms of shipping package. It is further designed to be loaded without the necessity of first lifting such boxes on to the base of the truck, such loading with my truck being accomplished by the person at the back of the truck through the means hereinafter described.

In its preferred form, my invention is illustrated in the accompanying drawings in which:—

Figure 1 is a side elevation of the truck loaded with two superposed "hamper" crates; Fig. 2 is a horizontal sectional view on the line a—a, Fig. 1, the load being removed; Fig. 3 is a top plan view of the truck with the load removed therefrom. Fig. 4 is a fragmentary view in elevation of the rear of the truck frame, showing the connections of the crank arms of the rock shafts.

Referring to the drawing by numerals, 1 indicates the stringers and 2, 3 and 4 the cross bars of the frame of a wheeled truck of conventional design. Across the lower extremity of the framing I secure the curved band 5 having its ends preferably extending some distance above the truck frame to partially inclose the lower portion of the package loaded thereon. This band is designed to support the lower most of the packages mounted on the truck as will be hereinafter described. Intermediate this band 5 and the rear end of the truck I similarly secure curved bands 6 against which the load is designed to rest. While these bands have been described and shown as curved, it is obvious their shape may be altered to adapt them to other than rounded shipping packages.

On the truck frame I mount load gripping devices comprising a pair of complemental gripping arms located at the sides of the truck and swinging transversely inward to grip between them the upper part of the lowermost of the superposed crates, etc. At the rear of top end of the truck I mount a gripping arm designed to swing downwardly lengthwise of the truck to grip the top of the upper of these superposed crates. These gripping devices are constructed as follows:

On the upper or rear cross bar 4, is a transverse rock shaft 7, suitably journaled thereon as by the staples shown. This rock shaft extends across the top of the cross bar to approximately its middle at which point it is bent to form a gripping arm $7^a$ provided at its end with a suitable load gripping hook. The other end of the rock shaft 7 terminates adjacent the stringer of the truck at which point it is provided with a crank arm $7^b$ extending preferably in the same direction as arm $7^a$. To this crank arm intermediate its ends, is secured a coiled spring 8 having its other end secured to the truck framing and normally tending to rock shaft 7 to swing its gripping arm $7^a$ inwardly and downwardly toward the load on the truck. On the upper or front face of the cross bar 3 located centrally of the truck frame, are located suitable bearings 9 in which are journaled the longitudinally extending rock shafts 10 having their lower ends provided with a portion bent at right angles to the rock shaft to form complemental gripping arms 11 provided at their ends with inwardly bent gripping hooks $11^a$ and swinging transversely inward toward each other to grip the load between them. The other or upper ends of these rock shafts 10 are likewise bent at right angles to the shaft to form crank arms 12 extending toward the under side of the truck and in an opposite direction to the gripping arms 11.

The ends of these crank arms are preferably formed with hooked ends to facilitate the attachment of coiled springs 13, having their other ends secured to the frame of the truck and normally causing said crank arms to rock shafts 11 to swing the gripping arms and their hooks transversely inward toward each other. These complemental side gripping arms 11 and the upper gripping arm $7^a$, are normally thrown inward to load gripping position by the springs secured to them and to the truck frame. In order to withdraw them from such position to permit loading or unloading I have connected their crank arms so that all the gripping arms can be conveniently withdrawn from load contacting position by rocking the shaft 7, against the tension of its spring. These connections are preferably made as follows:

On the under or rear face of the cross bar 3 is secured a bracket 14 in which is pivotally mounted a bell crank lever 15 at a point intermediate the ends of its upper arm $15^a$. The other arm of this bell crank lever extends transversely inward and terminates adjacent the stringer of the truck frame. The arm $15^a$ is connected to the crank arms 12 of the rock shafts 11 by links 16 attached at their outer ends to said crank arms intermediate the ends thereof, and having their inner ends secured to the arm $15^a$ at either side of its pivot point as shown. The rocking of the bell crank lever on its pivot to draw these links transversely inward will, therefore, rock the crank arms 12 inward against the tension of the springs 13. This inward motion of the crank arms will rock the shafts 11 to swing their gripping arms $11^a$ transversely outward away from load gripping position. In order to effect this withdrawal simultaneously with the similar movement of the upper rock shaft 7 and its gripping arm $7^a$, I connect the end of the crank arm $7^b$ of the latter with the end of the arm $15^b$ of the bell crank lever by means of a rod 17. This rod at its upper end is pivoted to the crank arm $7^b$ and has its lower end bent backwardly upon itself to form a slot $17^a$ in which is inserted a bolt or pin secured to the end of the arm $15^b$ of the bell crank lever. This connecting rod therefore permits the withdrawal of the gripping arms and their hooks from load gripping position by moving the arm $7^a$ against the tension of its spring and thereby rocking shaft 7 and its crank arm $7^b$. By having the lower end of the rod slotted, I allow for "lost motion" between the rock shaft 7 and bell crank lever 15 and thereby permit the gripping arms to adapt themselves to any difference in the relative positions of the gripping surface of the superposed crates.

For use especially with superposed pack- ages of the "hamper" type, I prefer to secure to the upper face of the cross bar 3 at its lower edge a plate 18 provided with an upturned edge $18^a$.

I will now describe the operation of my truck as it is used in loading a pair of tiered "hamper" crates arranged head to head as shown in Fig. 1 of the drawings. The truck is wheeled up to the load and then raised approximately perpendicular, the operator grasping the gripping arm $7^a$ and pulling upwardly upon it. This will, through rod 17 and the other connections hereinbefore described, serve to move the gripping arms 11 transversely outward and away from each other and will allow these arms to partially encircle the upper side of the lower crate adjacent its top, the lower side of the crate being at the same time partially encircled by the curved band 5. The gripping arm $7^a$ of the upper rock shaft 7 having been also drawn back, this permits this arm to be brought over the uppermost portion of the superposed crate. The gripping arm $7^a$ is now released whereupon the springs 8 and 13 will simultaneously actuate the rock shafts 7 and 10 respectively through the means hereinbefore described and cause the hooks on the gripping arms to contact with and grip the two crates loaded on the truck. The lower crate because of its tapering form is held in the curved bar 5 securely wedged against downward movement and the upwardly bent end $18^a$ of the plate 18 engages under the hoop at the top of the crate, the gripping arms $11^a$ also engaging the sides of the crate adjacent its top. The upper crate rests on top of the lower one and against the curved band 4 secured to and extending across the truck frame. When the arm $7^a$ is released, the spring 8 pulls this arm with its hook down to grip the top of the upper crate and both crates are therefore securely held to the truck. The handles of the truck can now be lowered to wheeling position and the load carried to the desired point.

While I have described this truck as being more particularly adapted for use in loading tapering crates of the "hamper" type, it is obvious that it may be used for various other species of loads both in its present form and by adaptation within the spirit of my invention.

What I claim therefore and desire to secure by Letters Patent is:

1. A truck provided with a plurality of operatively connected load gripping means adapted to simultaneously engage with a load at the sides and top thereof.

2. A truck provided with a plurality of load gripping members adapted to engage with a load at the sides and top thereof, means normally tending to effect such engagement, and means permitting withdrawal of such members from load engaging position.

3. A truck provided with a plurality of load gripping means embodying complemental gripping members movable transversely of the truck and a gripping member movable longitudinally thereof and means for bringing said members simultaneously into load gripping position.

4. A truck provided with a plurality of load gripping means embodying complemental load gripping members mounted intermediate the ends of the truck and movable transversely thereof, and load gripping means at the upper or rear end of the truck movable longitudinally thereof.

5. A truck provided with a plurality of load gripping means embodying complemental load gripping members mounted intermediate the ends of the truck and swinging transversely thereof, a load gripping member mounted at the upper or rear end of the truck and swinging longitudinally thereof, means normally swinging said members into load gripping position, and means permitting withdrawal of said members from such position.

6. A truck provided with a plurality of load gripping means embodying rock shafts mounted intermediate the ends of the truck and provided with complemental load gripping arms, swinging transversely of the truck frame, a rock shaft mounted on the upper or rear end of the truck and provided with a load gripping arm swinging longitudinally of the truck frame, spring means normally rocking said shafts to swing the arms thereof into load engaging position and means connected to said rock shafts permitting the rocking of said shafts to withdraw the gripping arms from such position.

7. A truck having load supporting means at its lower extremity and provided with a plurality of load gripping means embodying rock shafts mounted intermediate the ends of the truck and provided with complemental arms swinging transversely thereof and adapted to grip the load between them, a rock shaft mounted on the upper or rear end of the truck and provided with a gripping arm swinging longitudinally thereof and adapted to grip the top of the load, springs normally rocking said shafts to swing said arms into load gripping position, and means secured to said rock shafts for permitting their actuation to withdraw said gripping arms from such position.

8. A truck having load engaging means at its lower extremity and provided with a plurality of load gripping means embodying spaced rock shafts mounted on the truck frame intermediate its ends, extending longitudinally thereof and provided with complemental gripping arms extending transversely of the truck frame and adapted to grip the load between them, a rock shaft mounted on the upper or rear end of the truck, extending transversely thereof and provided with a gripping arm extending longitudinally of the truck, crank arms on said rock shafts, springs secured to said crank arms and normally rocking said shafts to swing their gripping arms into load engaging position, and means secured to said crank arms for actuating said arms to withdraw said gripping arms from such position.

9. A truck having load engaging means at its lower extremity and provided with a plurality of load gripping means embodying spaced rock shafts mounted on the truck frame intermediate its ends extending longitudinally thereof and provided with complemental gripping arms extending transversely of the truck frame and adapted to grip the load between them, a rock shaft mounted on the upper or rear end of the truck, extending transversely thereof and provided with a gripping arm extending longitudinally of the truck, crank arms on said rock shafts, springs secured to said crank arms and normally rocking said shafts to swing their gripping arms into load engaging position, a lever pivotally mounted on the truck frame between said longitudinally extending rock shafts, links connected to said lever at either side of its pivotal point and extending to the crank arms of said rock shafts, and a rod connected at one end to the end of said lever and at the other end to the crank arm of the transversely extending rock shaft.

10. Means for loading and carrying a plurality of superposed packages comprising a wheeled truck provided intermediate its ends with complemental transversely movable gripping members engaging between them the lowermost of a plurality of superposed packages, and provided at its upper or rear end with longitudinally movable gripping means engageable with the top of the upper of the superposed packages.

11. Means for loading and carrying a plurality of superposed packages, comprising a wheeled truck provided intermediate its ends with complemental gripping arms swinging transversely of the truck and adapted to engage between them the lowermost of a plurality of superposed packages, and provided at its upper or rear end with a gripping arm swinging longitudinally of the truck and adapted to engage the top of the uppermost of said superposed packages.

12. Means for loading and carrying a plurality of superposed packages comprising a wheeled truck provided with load engaging and supporting means at the lower extremity thereof, and having intermediate its ends rock shafts provided with complemental load gripping arms extending transversely of the truck and adapted to grip between them the lowermost of a plurality of superposed packages, and having at its upper or rear end a rock shaft provided with a gripping arm extending longitudinally of the truck and adapted to engage the top of the uppermost of said superposed packages, crank arms on said rock shafts, means normally actuating said crank arms to rock said shafts and swing the arms thereof to load gripping position and means connected to sair crank arms to actuate said arms to withdraw the gripping arms from such position.

13. Means for loading and carrying a tapering shipping package comprising a wheeled truck, a curved band at the lower extremity thereof partially inclosing the base of the load, rock shafts journaled on the truck and provided with gripping arms extending transversely thereof and adapted to grip the load between them, a plate projecting from the truck framing and engaging the side of the package adjacent its top, means normally rocking said shafts to swing the arms thereof to load gripping position, and means for withdrawing said arms from such position.

14. A truck provided with a plurality of load gripping means comprising intermediate transversely movable side gripping means and longitudinally movable end gripping means, and connections between said side and end gripping means permitting independent movement thereof.

15. A truck provided with a plurality of load gripping means comprising intermediate transversely movable side gripping means, and longitudinally movable end gripping means, and connections between said means normally causing simultaneous action thereof, said connections also permitting independent movement of the side and end gripping means.

Signed by me at Bridgeton, New Jersey, this 31st day of May 1910.

EDWARD M. WEST.

Witnesses:
HOWARD L. TYLER,
WALTER H. BACON, Jr.

---

Copies of this patent may be obtained for five cents each, by addressing the "Commissioner of Patents, Washington, D. C."